United States Patent
Flamholz

(10) Patent No.: US 8,219,028 B1
(45) Date of Patent: Jul. 10, 2012

(54) PASSING INFORMATION BETWEEN MOBILE DEVICES

(75) Inventor: Abraham I. Flamholz, New York, NY (US)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 12/415,425

(22) Filed: Mar. 31, 2009

Related U.S. Application Data

(60) Provisional application No. 61/007,530, filed on Mar. 31, 2008.

(51) Int. Cl.
*H04B 7/00* (2006.01)

(52) U.S. Cl. .................................................. 455/41.2

(58) Field of Classification Search ................ 455/41.2, 455/41.3
See application file for complete search history.

(56) References Cited

U.S. PATENT DOCUMENTS

| | | | | |
|---|---|---|---|---|
| 7,427,926 B2 * | 9/2008 | Sinclair et al. | ................. | 340/4.2 |
| 7,925,022 B2 * | 4/2011 | Jung et al. | ..................... | 380/270 |
| 2004/0203381 A1 * | 10/2004 | Cahn et al. | .................. | 455/41.2 |

OTHER PUBLICATIONS

Hinckley, Ken. "Synchronous Gestures for Multiple Persons and Computers." Microsoft Research, Redmond, WA; 2003. (10 pages).
Holmquist, Lars Erik, Friedemann Mattern, Bunt Schiele, Petteri Alahuhta, Michael Beigl, and Hans-W Gellersen. "Smart-Its Friends: A Technique for Users to Easily Establish Connections Between Smart Artefacts." Lecture Notes in Computer Science; 2001. (6 pages).
Lester, Jonathan, Blake Hannaford, and Gaetano Borriello. "'Are You With Me?'—Using Accelerometers to Determine if Two Devices are Carried by the Same Person." Lecture Notes in Computer Science; 2004. (18 pages).

* cited by examiner

*Primary Examiner* — Stephen Jones
(74) *Attorney, Agent, or Firm* — Fish & Richardson P.C.

(57) ABSTRACT

A method for sharing information between mobile devices is disclosed. The method includes sensing a physical motion event of a first mobile device, obtaining information reflecting a physical motion event of a second mobile device that is in proximity to the first mobile device, and transmitting data to the second mobile device upon a determination that the physical motion events match each other.

19 Claims, 13 Drawing Sheets

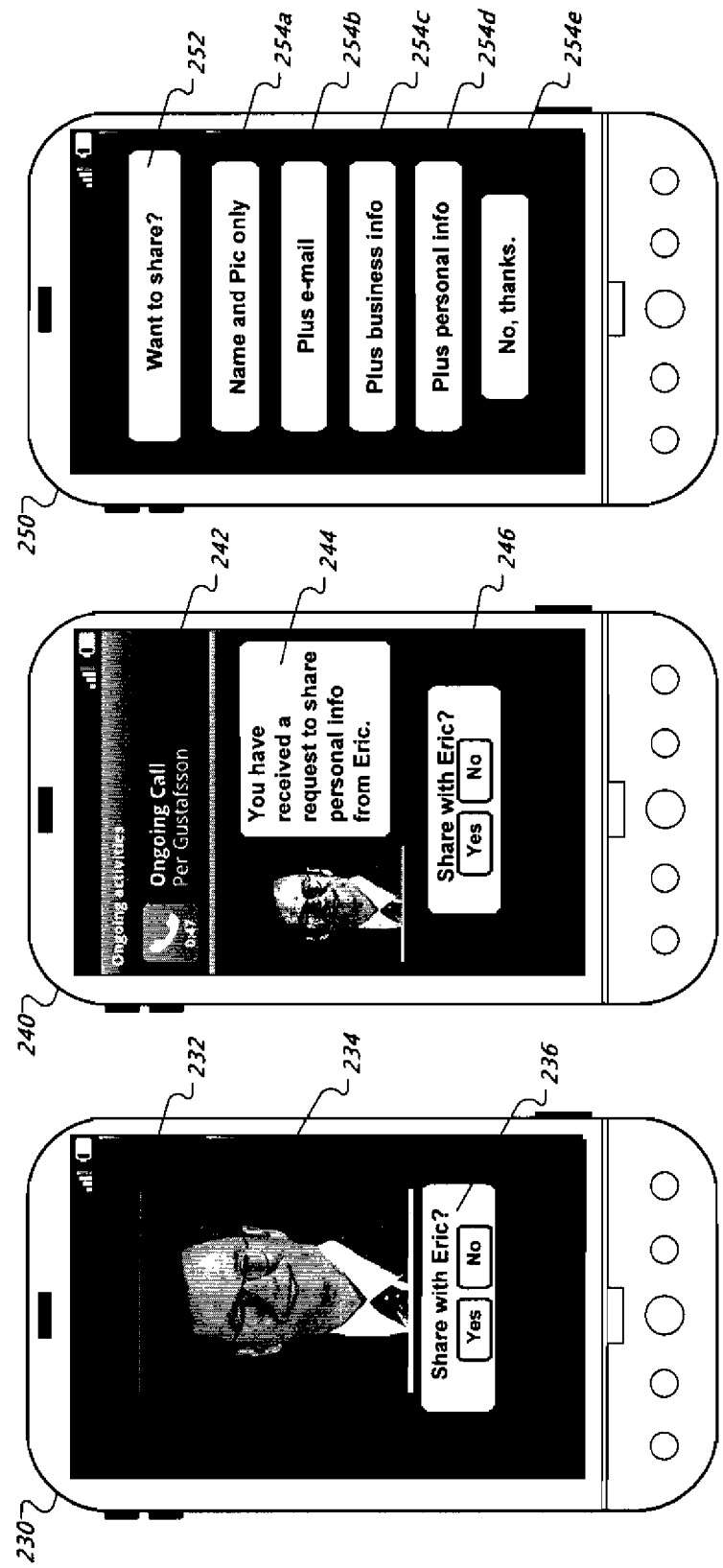

PASSING INFORMATION BETWEEN MOBILE DEVICES

CROSS-REFERENCE TO RELATED APPLICATIONS

This application claims the benefit under 35 U.S.C. §119 (e) of U.S. Provisional Application Ser. No. 61/007,530, filed on Mar. 31, 2008, which is herein incorporated by reference in its entirety.

TECHNICAL FIELD

This document relates to systems and techniques for sharing information between mobile devices that are proximate to one another.

BACKGROUND

People are social creatures. We meet, we greet, we network, we socialize. We also like to share information, be it news, gossip, business talk or anything else. When we first meet a new person, for instance, we may exchange contact information so that we can communicate later, such as by writing on the back of a napkin or other scrap paper. With people we already know, we may swap family photos, e-mails, or other similar items. And when we are working with electronic devices such as personal digital assistants (PDAs) or smartphones, we may simply beam such information back-and-forth using wireless communication protocols.

However, we don't always want to share such information with everyone in the area, and wireless communications spread out in every direction (absent a dish or other structure to direct them, or the ability of walls to block them, as with infra-red signals). As a result, users may e-mail information to each other when they meet so as to limit the ability of a third party to intercept such information. Other elaborate mechanisms may likewise be used to provide relatively secure communications between two wireless devices that are in proximity to each other (e.g., within feet or yards of each other and within a line of sight of each other).

SUMMARY

This document describes systems and techniques that may be used to determine when to share information between mobile devices that are in close proximity to each other. For example, coordinated motion of two devices may be taken as an indication that the owners of the devices want to exchange information with each other, and such transfer may occur in a protected manner so that devices other than the two devices cannot easily eavesdrop. To provide security from accidental transmissions, the systems and techniques may seek manual user approval, such as by providing limited information between the devices, showing such information to the user of a device, and seeking approval from the user to transmit detailed information to the other device. Such requirement of approval may be used as a gateway to the reception of information, in addition to the transmission of information, so as to prevent a user from accidentally transmitting information to someone else, and also to prevent the user from receiving unwanted information from other users.

In certain implementations, such systems and technique may provide one or more advantages. For example, users of mobile devices may be able to communicate information, such as contact information, even where they do not have a data plan, where data transfer of all information is over a short range. Users may also exchange e-mail addresses or telephone numbers at short range and then exchange other information, such as more private information (which could include telephone numbers), using e-mail. Such exchange of information may occur, in certain circumstances, without requiring the users to type in an e-mail address or other extensive information that takes time to enter and brings a risk of data entry errors. In addition, the techniques described here may permit such transmission in a public area without others snooping on the communication. Moreover, in certain cases, the users may control whether their information is shared and whether they will receive information from other users.

In one implementation, a method for sharing information between mobile computing devices is disclosed. The method comprises sensing a physical motion event of a first mobile device, obtaining information reflecting a physical motion event of a second mobile device that is in proximity to the first mobile device, and transmitting data to the second mobile device upon a determination that the physical motion events match each other. Sensing a physical motion event of the first mobile device can comprise obtaining acceleration data from an accelerometer in the first mobile device. Also, the determination that the physical motion events match each other can comprise comparing patterns of the motion events and times at which the motion events occurred. In addition, the physical motion events can be determined to match if the pattern and time of the motion event for the first mobile device are separated from the pattern and time of the second mobile device by less than a predetermined separation distance.

In some aspects, the physical motion event comprises momentary contact between the first mobile device and the second mobile device. The physical motion event can also comprise coordinated hand-held motion of the first mobile device and the second mobile device at a distance. Also, the information reflecting a physical motion event can comprise a key derived from an acceleration measurement of the second mobile device, and further comprise using the key to decode encoded information from the second mobile device. The method can further comprise, upon a determination that the physical motion events match each other, prompting a user of the first device to confirm an intent to transmit data to the second mobile device.

In other aspects, the method can further comprise automatically receiving, from the second mobile device, data of a type that matches the transmitted data. The received and transmitted data can correspond to contact information for users of the second mobile device and the first mobile device, respectively. Moreover, the method can also include receiving, from a user of the first mobile device, confirmation to share private information with the second mobile device, and transmitting the private data to the second mobile device only if the confirmation is received.

In another implementation, a mobile computing device is disclosed. The device comprises an accelerometer to sense motion of the mobile computing device, a wireless interface to communicate with devices in a local proximity of the mobile computing device, and a communications coordination module to compare physical motion data for the mobile computing device to physical motion data of another mobile computing device and to cause the mobile computing device to transmit information to the other mobile computing device reports motion data matching motion data from the accelerometer. The device can further comprise an accelerometer data encoder coordinated with an accelerometer data encoder in the other mobile computing device to generate commonly encoded accelerometer data. Also, the commonly encoded accelerometer data can include a time stamp corresponding to the time of an acceleration event. In addition, the communications coordination module can cause the mobile computing device to transmit information if a pattern of the physical motion data from the mobile computing device matches a pattern of the physical motion data from the other mobile computing device within a predetermined separation distance.

In some aspects, the device further comprises an accelerometer limit detector to permit provision of physical motion data to the communications coordination module only if the accelerometer provides acceleration signals matching a predetermined profile. The predetermined profile can comprise an impulse indicative of physical contact between the devices, and can comprise repeated motion of the devices. The device can also comprise an alert generator to prompt a user of the mobile computing device to confirm an intent by the user to transmit data to the other mobile computing device. The interface can also be configured to receive, from the other mobile device, data of a type that matches data transmitted by the mobile computing device.

In another implementation, a mobile computing device is disclosed that comprises an accelerometer to sense motion of the mobile computing device, a wireless interface to communicate with devices in a local proximity of the mobile computing device, and means for enabling communication from the mobile computing device to the devices in a local proximity of the mobile computing device.

The details of one or more embodiments are set forth in the accompanying drawings and the description below. Other features and advantages will be apparent from the description and drawings, and from the claims.

DESCRIPTION OF DRAWINGS

FIGS. 2C-2E show example displays on a mobile device.

Like reference symbols in the various drawings indicate like elements.

DETAILED DESCRIPTION

This document describes systems and techniques for sharing information between users of mobile devices in a way that can prevent eves-dropping by other mobile device users, and can prevent accidental sharing of a first user's personal information, or unwanted receipt of a second user's information by the first user. Eavesdropping may be prevented by having two devices communicate in a manner that is agreed upon based on coordinated motion between the devices, such as tapping the devices together. For example, an encryption key may be generated that is a function of an acceleration sensed by accelerometers in the two devices when a tapping event is identified. Because the motion experienced by the two devices should generally match, their internally generated keys should also match. In some implementations, the Diffie-Hellman key-exchange protocol may be used to generate a key for encrypting subsequent communications between devices. Unwanted sharing and receipt of information may be avoided by providing a confirmation request to the user of a device, so that simple motion of the device (e.g., jiggling in a pocket) or attempts at hidden tapping do not result in sharing of information.

Such security issues may be considered to occur, for example, at three different levels: (1) untrusted people trying to watch an information exchange and steal the data exchanged, (2) an untrusted person trying to pair with another person's device to inject data onto it, and (3) an untrusted person trying to pair with another person's device in order to get that other person's contact information. The generation of keys in the manner discussed here may prevent the first problem by creating a key that is based on coordinated actions of two users that is hard to replicate by a distant onlooker. The second and third problems may be avoided by requiring close contact between users, so that an interloper would be recognized, and may be further avoided by including a manual confirmation by a user before their device will accept information form another user, and before it will share private information with another user.

Figure 1:
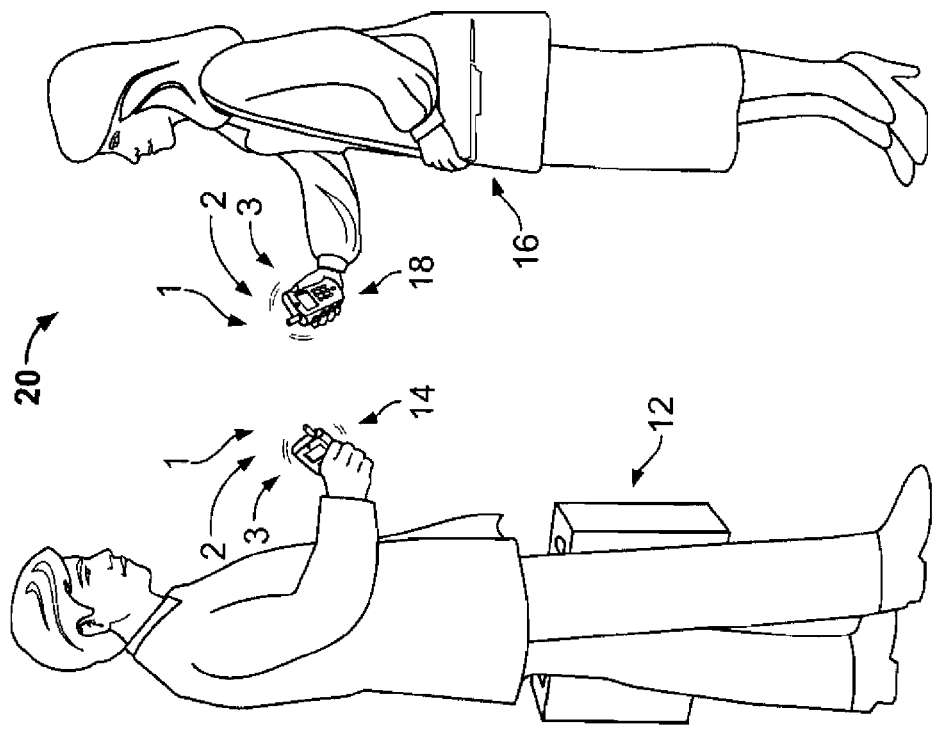
FIG. 1 is a conceptual diagram showing two example scenarios of mobile device user indicating an intent to share information.
Figure 1:
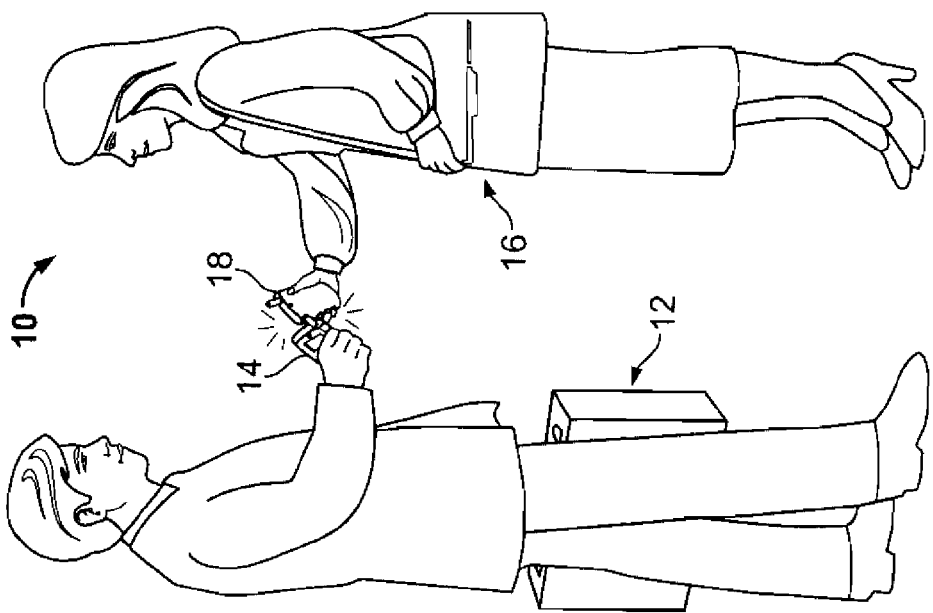

FIG. 1 is a conceptual diagram showing two example scenarios 10, 20 of mobile device users indicating an intent to share information. Each of the scenarios 10, 20 occur where users are in proximity to each other, and may occur in public areas among many other people. For example, the users 12, 16 may be business colleagues who have met at a convention during a networking event. After some discussion, the users 12, 16 may decide that they would talk like to follow up their business discussion later, and may decide to exchange contact information with each other. Such an exchange may occur by sending the contact information by way of electronic mail messages, but such a transmission method may require each of the users or at least one of the users 12, 16 to have to type in an e-mail address of the other user.

In the scenario 10, the users 12, 16, instead indicate an intent to share information by tapping their devices 14, 18 together one or more times. The users may understand, based on documentation provided with their mobile devices, that such an action will trigger their mobile devices 14, 18 to open a communication session with each other for passing of certain information between the devices 14, 18. In particular, each of devices 14, 18 may be equipped with a motion sensor such as an accelerometer, and the coordinated motion created by the tapping of the devices 14, 18, such as acceleration in one direction followed by sharp acceleration in the opposite direction, may signal to each device 14, 18 to begin an information sharing procedure.

For example, each of devices 14, 18 may recognize particular acceleration events as indicating a likely intent by a user to share information. When such events are recognized, the devices 14, 18, may invoke one or more applications to affect the sharing of information. Such applications may open a communication session between devices 14, 18, using a key to transmit information. In some implementations, the key may agreed upon by a secure key-exchange procedure. For example, the selected key-exchange technique may be the Diffie-Hellman key exchange protocol.

In scenario 20, the devices 14, 18 are not placed into contact to indicate an intent to share information. Rather, a different type of coordinated motion between the devices 14, 18 is instituted by the users 12, 16. In this particular example, the users 12, 16, are handling their devices according to the well-known game of rochambeau, or rock/paper/scissors, where each device is lowered quickly and raised slightly slower than it was lowered. The motion is conducted three times in a coordinated manner, typically while the users each say "one, two, three," to help coordinate the motion and to ensure that both users make the final motion at the same time (so that one user cannot delay selecting their choice until after they see the choice of the other user). In such an example, the timing of the movements may be used to generate a key. Specifically, the time between each downward thrust of the devices 14, 18 may be used to generate the key. If the motion of the users was sufficiently coordinated, each device may gather similar timing information and the two devices may thus use the timing information to generate a key, where the keys generated by the two devices may match each other if the key generation is made "loose" enough to accommodate a limited ability of two users to coordinate their motions perfectly.

Keys as generated in this manner may then be used in further steps for creating a communication between the devices 14, 18. In particular, to ensure that the users 12, 16 truly intend to share information, they may be prompted for input to indicate such an intent. For example, an initial passing of information that is public or semi-public may be made between the devices, such as a photo of user 14 being passed to device 18. User 16 may then be prompted by device 18 for a confirmation, by pressing a control on a display of device 18, to indicate the user 16 would like to receive further information from user 12 that may be private or more private, and is willing to provide information to user 12 that is private or more private than was the initially transferred information.

Once both users have confirmed an intent to transfer the additional information, that additional information may be transferred between the devices 14, 18. The various data transfers between devices 14, 18 may take a variety of formats and follow a variety of protocols, and the particular protocol is not essential here. For example, the transfer may occur using Bluetooth pairing, since many mobile devices include Bluetooth capability as a standard feature. (However, Bluetooth may not be the best mechanism, as it has security built in, can be relatively slow, and may require manual entry of a shared secret that may be equivalent in effort to typing in the contact information.) Other examples of ways in which data may be transferred between devices 14, 18 are shown in the following figures.

Figure 2A:
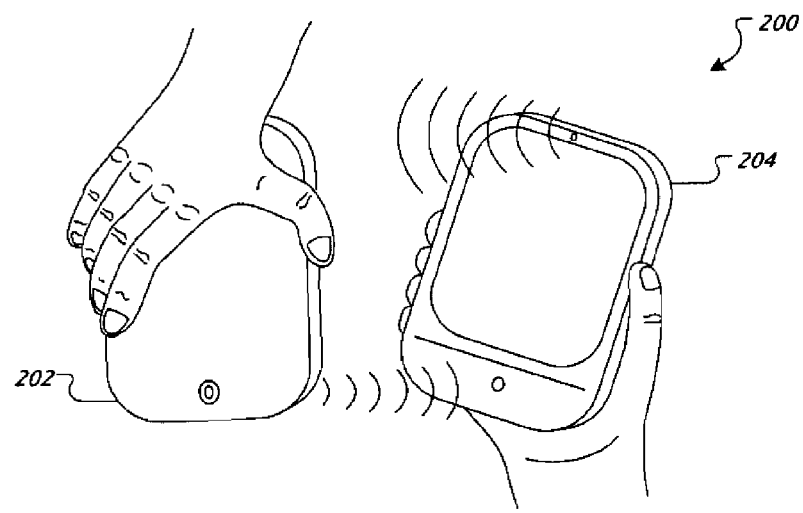
FIG. 2A shows two mobile devices in an acoustically coupled data transfer relationship.

FIG. 2A shows two mobile devices 202, 204 in an acoustically coupled data transfer relationship. Such a situation may occur after two users who are in close proximity to each other indicate an intent to share information with each other, such as by using the techniques shown in FIG. 1. In this example, the devices 202, 204 are placed face-to-face in inverse position to each other, so that the speaker of device 204 is positioned close to the microphone (not shown) of device 202, and vice-versa.

Typically, the data to be transmitted in this manner is relatively small, such as contact information and the like. Thus, a very low bit rate transmission protocol may be used, so that higher levels of noise can be handled by the process. Various familiar techniques may be used to permit such data transfer across a gap expected to occur with such devices. Error checking in particular may be used to ensure that the data is not corrupted during transfer. The bit rate may, in certain instances, be variable, so that lower transfer rates are used in noisy environments and higher transfer rates are used in better situations.

Instructions may be shown on the devices 202, 204, such as by showing a graphic that looks similar to FIG. 2A, so that the users know what to do to help created the acoustically coupled data transfer. Feedback may also be used, such as beeping of the devices 202, 204 to indicate to the users that data transmission has been completed or that problems with data transmission have occurred. For example, a low buzzer sound or some other common sound that indicates failure (such as a Raspberry or Bronx Cheer sound) may indicate to the users that they need to hold their devices 202, 204 closer together, or need to move to a quieter area. A "bing" sound (like a cooking timer) may indicate to the users that the transmission is complete. Generally, the feedback may be made audible, since the displays of the devices 202, 204 will typically need to be held near each other, or may otherwise be out of the convenient view of the users. Visual feedback may also be provided, such as by a strength meter showing the relative current speed of the data transmission.

Also, before the data transfer begins, the devices 202, 204 may indicate to their users an expected time to complete the transmission. Such an expected time may be computed using only the size of the data file to be transferred and an expected transfer rate. An initial attempt to communicate may also be made, so that an expected communication rate under prevailing conditions may be computed, and the estimated time to completion may also incorporate that information. In such a circumstance, the users of devices 202, 204 may be given an opportunity to select the level of information to be transferred. For example, transfer of basic contact information may be indicated on a device display to take one estimated time, and the information with an additional image transmitted may be indicated by the devices to take another estimated time. Controls may be provided on the display, so that the user may select which level of information to share, so as to match the amount of time they have to wait for the data transfer.

Figure 2B:
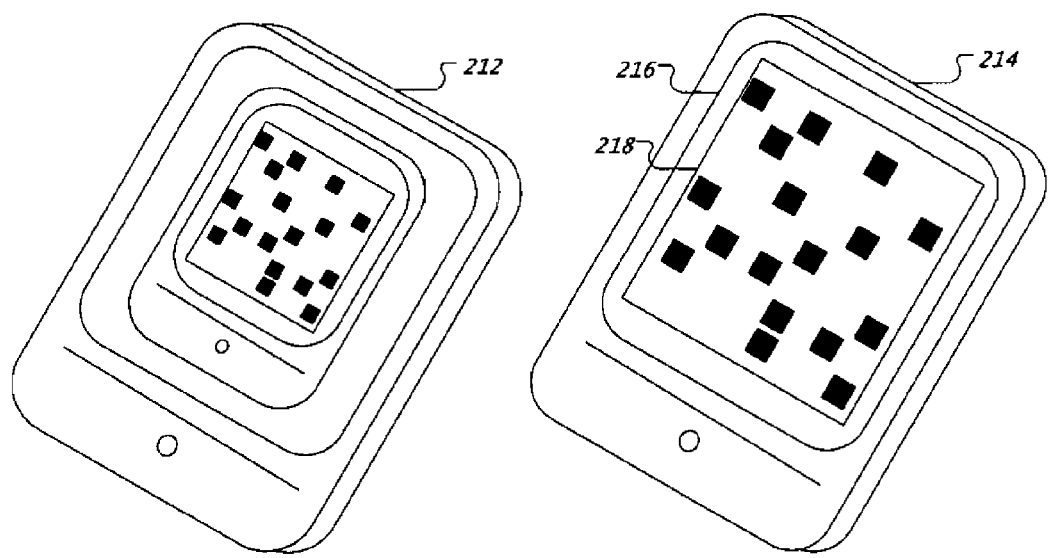
FIG. 2B shows two mobile devices in an visually coupled data transfer relationship.

FIG. 2B shows two mobile devices 212, 214 in an visually coupled data transfer relationship. In particular, device 212 has a lens (not shown) of its digital camera aimed at the display 216 of device 214, and is capturing a still image or moving images of the device 214. In this example, display 216 is generating an image of a two-dimensional bar code that is similar to a traditional bar code but can encode additional information. The manner in which the image is encoded may occur according to a standard, which standard may be accessible to and followed by both of devices 212, 214. Additional data may be encoded where multiple codes are displayed. Thus, for example, device 212 may take a video of display 216 and may analyze each distinct display of code 218 on display 216.

The particular times and locations for the codes may be coordinated between the devices. For example, a certain icon or icons may be shown near the code and may be used by an application running on device 212 to account for the size and position of the code (i.e., alignment elements). Likewise, an application running on device 212 may analyze consecutive frames in a video of display 216, perhaps after cutting away portions outside the code area, and may capture data each time an image changes (e.g., if the codes were changed every several seconds or portions of a second), and may then append the data to each other to generate the information that was intended to be sent by device 214.

Both of the transmission techniques shown in FIGS. 2A and 2B generally are capable only between consenting users, and work only at short ranges. As a result, electronic snooping of the communications using these techniques may be much harder than it would be for wireless communication techniques.

FIGS. 2C-2E show example displays 230, 240, 250 on a mobile device. Each of the displays 230, 240, 250 indicates different manners in which a user of a mobile device may be prompted to indicate whether they would like to share private or semi-private information with a user of another mobile device. Such information may include, for example, address, e-mail, and telephone information (e.g., information from a vCard or the like), and may also include various other information such as word processing documents, database files, web pages, URLs, and other information that two users of mobile devices may want to pass to each other.

FIG. 2C shows a simple request asking a user whether they would like to share their information with another user named Eric. In this example, the user's device has carried out an initial transfer of information with Eric's device—passing a simple image and a first name. The user may have passed similar information to Eric. Such information may be information that the user has identified as public or semi-public on their device. Alternatively, such information may be taken from a location other than the user's device, including from a social networking web site at which the user is a member.

In addition, the data sharing may also be made dynamic. In particular, as a user updates their contact and other similar information, it may be updated for users with which they have shared the information. For example, the sharing of information may include a pointer to a social networking site where various users may keep their personal information, such as in public, semi-private, and private sub-groups. An event manager in such a system may generate an event notification for all users shown to have access to the first user's information when the first user changes the information. Thus, for example, when a user logs onto such a system, their device may initially check for recent notifications and may download updated contact information from the first user if the device sees such a notification. As a result, a user's device may be as up to date as their most recent synchronization with the system. Of course, privacy may be protected in such a system by permitting a user to specify the level of access that any other user or group of user may have to their information.

In FIG. 2C, the user is being shown an image 234 of Eric, and a control 236 where they are being asked if they would like to share their additional (e.g., private) information with Eric, and are being given an opportunity to register assent or dissent. By prior experience, the user may understand what information is to be shared with Eric if he or she assents. Such assent may result in the information being transferred to Eric's device—or may await common assent from Eric.

In FIG. 2D, the user was on a telephone call when they made indications that they would like to share information. As a result, indicators for the telephone call, which may have previously filled the whole of the display, have been shrunk to fill only an active application area 242 at the top of the display. The area 242 displays the name of the person at the other end of the call, an icon indicating that a call is currently occurring, and an elapsed time for the call in the icon.

A text box 244 provides instructions to the user, indicating that the user has received a request to share information with Eric, the gentleman who is pictured in the image. And a control 246 allows the user to indicate that they either do or do not wish to share private or semi-private information with the other user.

In FIG. 2E, the user may select a number of options for sharing different levels of information with another user. A text box 252 serves as a title for the display, and indicates that the user is being asked whether, and to what extent, they want to share information with another user. Various other text boxes that are selectable controls 254a-e permit the user to select different levels of access that they wish to grant another user—from sharing only a name and picture (254a), adding an e-mail address (254b), also adding business information such as business telephone and fax numbers (254c), adding personal information like a home address and/or cellular telephone number (254d), or declining to share any information at all (254e).

The particular level of information shared may be, in the end, a lowest common denominator between the two sharing users. For example, if one user chooses to share only business information and the other chooses to share personal information also, the two may simply share business information (under an assumption that such information is the most that both participants feel comfortable sharing, and thus in an effort not to upset either participant). Alternatively, each user may select his or her own level of access. In such a situation, however, a user can prevent his or her own information from being shared and can prevent receipt of the other user's information by indicating no interest in sharing (e.g., box 254e). In this manner, the user can be kept in the feedback loop so as to prevent other users from spamming his or her contacts list.

Also, any information received in the manners discussed here may be segregated from other information in a user's system. For example, contact information that is obtained through such sharing may initially be tagged as being shared information, and thus not on a par with information from confirmed friends or associates in a user's contact list. As a result, such information may not show up in an ordinary view of the user's contact information, so as to avoid cluttering such information with contacts whom the user does not know well. A user may then "promote" such contacts at a later time, such as by changing the label associated with their information. Such varying control over access may be generalized further, and may be managed by a system such as the OPEN-SOCIAL system.

Figure 3:
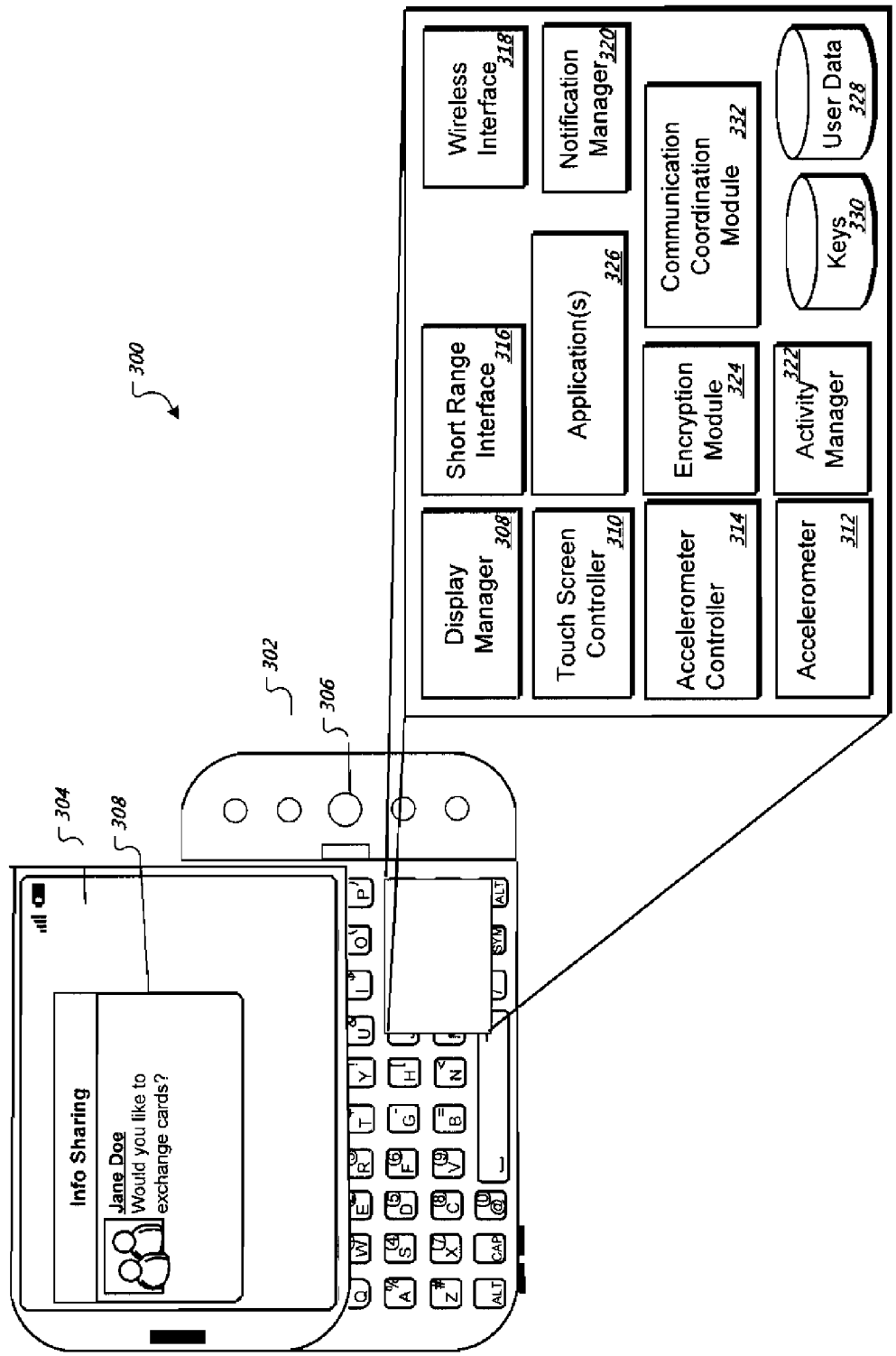
FIG. 3 is a block diagram of a mobile device that can share information at short range with other devices.

FIG. 3 is a block diagram of a mobile device 302 that can share information at short range with other devices. The device 302 may take a variety of forms. In this example, the device 302 is showing as a touchscreen smartphone that is a slider phone, where the touchscreen 304 is slid aside to reveal the keyboard. User input may be provided to the device 302 by a number of mechanisms, including the keyboard, the touchscreen 304, and a trackball 306, along with other selectable buttons. In general, the device 302 may be equipped with functionality to exchange information over short ranges or long ranges with other users, as indicated by dialog box 308, which is asking the user of the device 302 whether they would like to exchange information, such as vCards or other similar information, with another user.

A number of components provided in device 302 may cooperate to provide such functionality. Display manager 308 is provided to supervise and coordinate information to be shown on the touchscreen display 304. The display manager 308, for example, may be provided with data relating to information to be displayed, and may coordinate data received from various different applications or modules. As one example, display manager 308 may receive data for overlapping windows on a windowed display and may determine which window is to be on top and where the lower window or windows is to be cut.

A touchscreen controller 310 may be responsible for receiving information regarding input provided by a user on touchscreen 304, and forwarding such information to various applications or modules. For example, the touch screen controller 310 may cooperate with the display manager 308 so as to understand what onscreen elements a user is selecting when they press on the touchscreen 304.

An accelerometer 312 may be provided for use in a variety of manners. For example, the accelerometer may be used to determine the state the machine is currently experiencing, so as to provide a proper display to the user. For example, if the accelerometer 312 indicates that the device 302 has not been moved for a substantial period of time, the device may be put into a sleep mode.

An accelerometer controller 314 receives input from the accelerometer 312 such as voltages or other signals from the accelerometer 312. The accelerometer controller 314 may be used to condition or interpret signals received from the accelerometer 312 or otherwise prepare such signals for use by other components in the device 302.

An activity manager 322 is responsible for managing actions on the device 302 such as input from a user, messages received through a network, and internal alerts generated by the device 302. For example, activity manager 322 may be alerted of activity by the accelerometer 312 by way of the accelerometer controller 314. The activity manager 322 may determine which applications 326 running on the device 302 are to be notified about such an activity.

In one example, a list of activities available in a particular operating system running on device 302 may be made available, and various applications 326 may register themselves with the operating system, and indicate which activities they would like to be notified about by the activity manager 322. In this manner, when an activity occurs, the activity manager 322 may readily determine which applications 326 or other components should be notified.

A notification manager 320 may communicate with activity manager 322 when certain events occur on device 302. In one example, the notification manager 320 may recognize the receipt, at mobile device 302, of a message from a wireless interface 318. The wireless interface 318 may take a variety of forms, for example, including the various forms of cellular telephone digital interfaces for transmitting data and or voice. The notification manager 320 may also receive other notifications and may communicate them appropriately to other modules in the device 302.

A communication coordination module 332 is responsible for coordinating sharing of information between users who are proximate to each other. The communication coordination module 332 may generally operate according to the mechanisms described more fully above and below, including by using a key exchange after a user of device 302 has subjected the device to coordinated motion with respect to another nearby device.

The communication coordination module 332 may, for example, use encryption module 324 to create a key relating to information received from accelerometer controller 314. The encryption module 324 may, for example, follow a predetermined algorithm for generating a key that relates in some predetermined manner to the intensity, duration, or other parameter of an acceleration faced by accelerometer 312.

One or more encryption keys may be stored in key database 330. For example, when encryption module 324 generates a key after device 302 has undergone an acceleration, that key may be stored in keys database 330. The key may be accessed later, after a nearby device has sent encrypted information to device 322.

In addition, communication coordination module 332 may access information in a user data database 328. The user data may include, for example, contact information for a user of device 302, files stored on the device 302, or any other type of appropriate information.

Communication coordination module 332 may also communicate with applications 326. For example, where communication coordination module 332 obtains contact information, it may pass such information to a contacts application running on device 302. In a like manner, the communication coordination module may obtain information from a contacts application for passing to another device.

In addition, communication coordination module 332 may communicate with a short range interface 316. The interface 316 may receive data communicated from a nearby mobile device and may also communicate data from device 302 to the nearby communication device. For example, the information communicated may include data representing contact information of users of the two devices.

In operation, in one example, a user of device 302 may initially shake the device 300 in some manner that is coordinated with the motion of the other device. The accelerometer 312 may sense such motion and may provide a signal to accelerometer controller 314. If the motion is sufficient in intensity or in character, the accelerometer controller 314 may in turn pass information to an activity manager 322. The activity manager 322 may be programmed to recognize acceleration data of a particular type, such as sharp changes in acceleration caused by contact of the device 302 with another object. The activity manager 302 may likewise filter out activity that is indicative of a false positive, such as acceleration created when the device 302 is placed in a user's pocket and the user walks across a room.

If the activity manager 322 determines that relevant information is being provided by accelerometer 312, it may provide such information to all components of device 322 that have registered themselves with that particular activity. Thus, for example, the activity manager 322 may pass data from the accelerometer 312 to the communication coordination module 332. Upon receiving such information, the communication coordination module 332 may further filter the data to determine whether it is relevant for short-term communication by the device 322. For example, the communication coordination module 322 may determine, where the device 302 is programmed for short range communication only after contact between two devices or a rock/paper/scissors routine, whether the accelerometer data indicates such contact or routine. If the data does not indicate such contact or routine, the communication coordination module 332 may ignore it and wait for additional activities reported by the activity manager 322.

If the information does indicate relevant activity, the communication coordination module 332 may provide such information to the encryption module 324 which may be programmed to generate a key from the data. In one example, the key is a function of an approximate maximum acceleration of the device, and a time at which such maximum acceleration occurred. The maximum acceleration may be rounded off so as to provide a more general key that is more likely to match with a key generated in a similar manner by another device. Also, the time may be blended into the determination because the time of contact is generally the time at which the acceleration of both devices will be equal The communication coordination module 332 may also refer to a contacts application 326 to obtain limited contact information about the user of device 302. For example, the communication coordination module 332 may request information that is labeled within the system as being public information, such as a first name of the user and perhaps a photo of the user. The communication coordination module 332 may then supply such information to the short range interface 316, after passing it through the encryption module 324 where it is encrypted using the generated key. Other devices in the vicinity of device 302, may then receive the encrypted communication. The device 302 may also be set to monitor for communications by other devices using short range interface 316. In this manner, the communication sent out by device 322 may be received readily by other similar devices, and device 302 may readily receive communications from the device with which it had recent court mated motion.

Upon waiting for several moments, the device 302, by way of short range interface 316, may receive an encrypted communication from another device. The short range interface 316 may provide data from the communication to the communication coordination module 332, which may apply the generated key to the encryption module 320 for decrypting the data. Such data may include a name of the other user and an image of the user, among other things.

The communication coordination module 332 may then cooperate with the display manager 308 to generate a dialog box or dialog boxes for interaction with the user. For example, the boxes may ask the user whether they would like to pass additional information to the other user. If the user agrees to passing such information, the communication coordination module 332 may request such information from an application module 320, may use the generated key and the encryption module 324 to encrypt the information, and may transmit the information by the short range interface 316, to the other device. In a similar manner, the device 302 may receive corresponding information from the other device and may use the encryption module 324 and the generated key to decode that received information. The decoded information may then be saved in the user data database 328, for example.

In this manner, a rather simple technique for passing data in a secure manner may be provided between two devices, particularly where the devices are in close proximity to each other. In the example, the user of device 302 did not need to enter any information about another user to share their own information in a secure way, but rather merely had to confirm by a dialog box that they wished to share information.

Figure 4A:
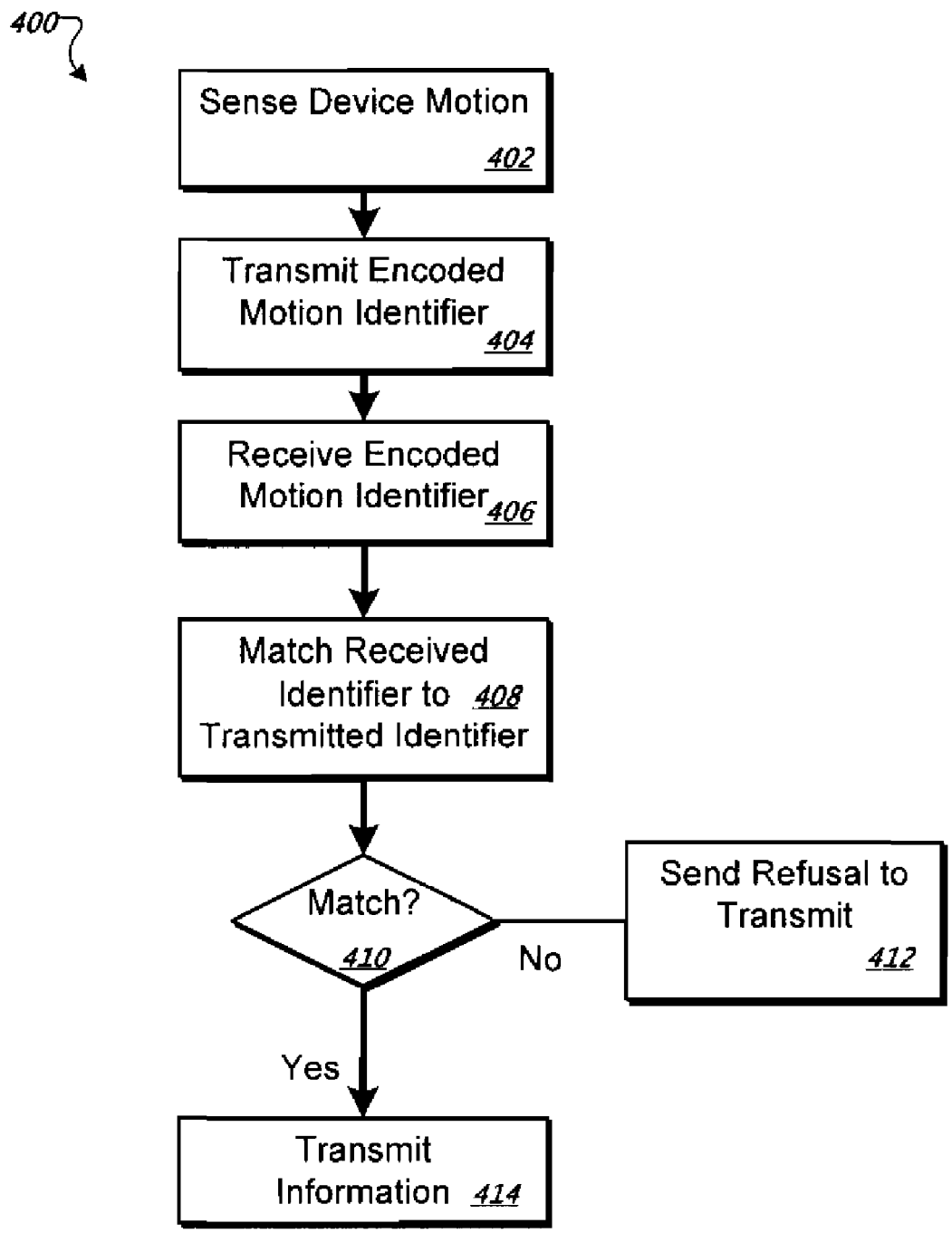
FIG. 4A is a flow chart of a process for establishing data transmission on a mobile device.

FIG. 4A is a flow chart of a process 400 for establishing data transmission on a mobile device. In general, the process 400 involves using motion of a mobile device as a basis for decoding information received from another mobile device.

At box 402, motion of the first device is sensed. An encoded motion identifier may then be transmitted, at box 404, to another, second device. The motion identifier may take a number of forms, and may include a welcoming message or other information from the user of the device. The motion identifier may also take a form that depended on the timing, size, or other aspect of sensed motion. At box 406, an encoded motion identifier from the other device is received. The reception may occur, for example, by the device turning on a short range transceiver, and leaving it on after its own data has been transmitted.

At box 408, the received identifier is matched to the transmitted identifier. For example, the identifiers may be numbers that approximate the amplitude and/or duration of a physical contact between the devices, or of other coordinated motion between the devices. At box 410, a determination is made regarding whether the motion identifiers match or not. If the identifiers do not match, then a refusal to transmit additional information is sent to the other device at box 412. If the identifiers do match, then additional information is transmitted to the other device at box 414. For example, where the numbers match and thus indicate that coordinated motion occurred between two devices, additional private information may be transmitted to the other device.

In this manner, information may be transmitted between two devices in a relatively coordinated manner without much effort from the users of the devices. The particular matched information between the devices may or may not take the form of an encryption key or other mechanism for providing secrecy for the communication between the devices. For example, the communication between the devices may be relatively open to other users in the vicinity of the devices. In contrast, and alternatively, the communication may be encrypted or otherwise protected including by the mechanisms discussed above.

Figure 4B:
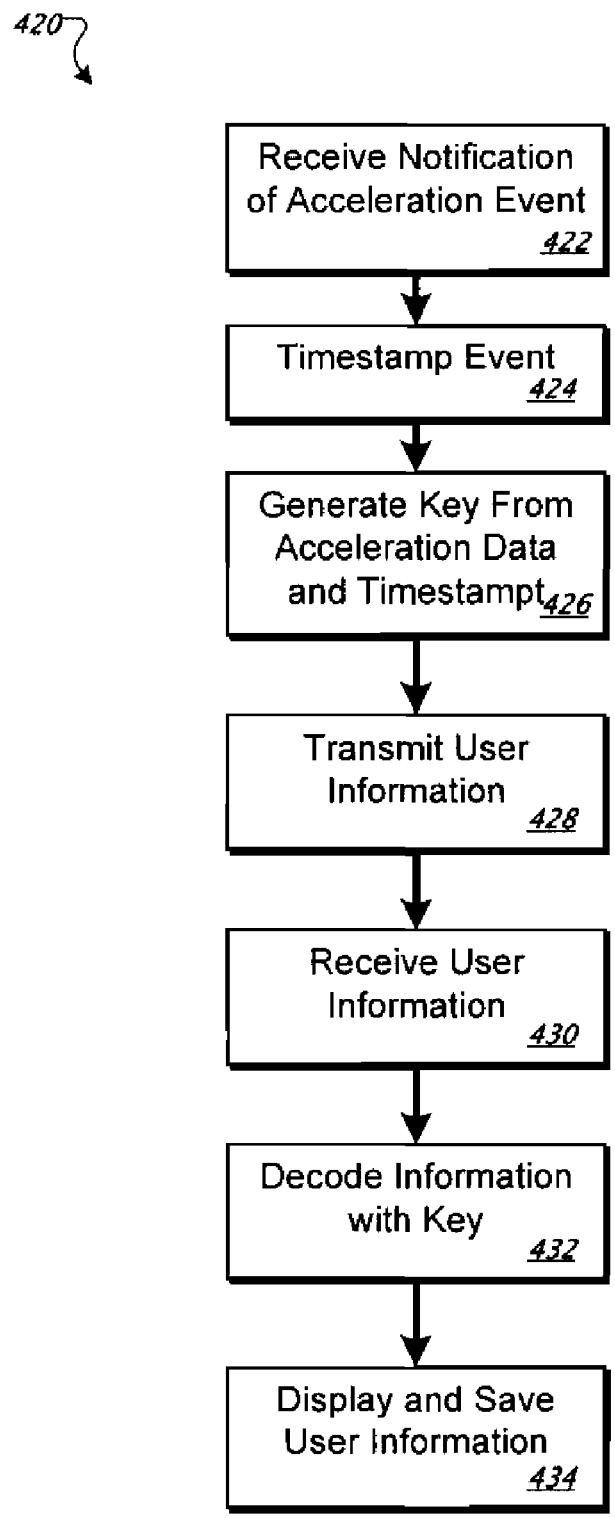
FIG. 4B is a flow chart of a process for establishing data transmission on a mobile device using a motion-based key.

FIG. 4B is a flow chart of a process 420 for establishing data transmission on a mobile device using a motion-based key. In general, the process 420 is similar to the example process discussed above for the operation of mobile device 302 in FIG. 3.

The process 420 begins when a notification of an acceleration event has been received (box 422). Such a notification may come from a notification manager operated by an operating system on a mobile device, or from other appropriate mechanisms. At box 424, a timestamp is provided for the event. The timestamp may be provided, for example, by an internal clock operating on a mobile device. The clock may be coordinated and reset periodically for accuracy by a central data network in a familiar manner.

At box 426 a key is generated from the acceleration data and the timestamp. Such generation of a key may occur in a number of different ways, such as by hashing or otherwise processing one or more acceleration data values, and time values. A particular mechanism by which such a key is generated is not critical here.

At box 428, user information is transmitted. Such user information may be transmitted in an encrypted manner using the generated key. In this manner, only devices that have access to the key may decode the data that is provided by the device. At box 430, user information from another device is received at the first device. Presumably, such information has been encrypted using a key that was generated in the same manner as was the key for the first device, and using substantially the same data as the generation of the key at box 426. As a result, at box 432, the key generated by the first mobile device may be applied to the encrypted data received from the second mobile device so as to decode that data. With the data decoded, it may then be displayed and saved in the form of user information, at box 434, such as contact data of a person who owns the other mobile device.

Figure 4C:
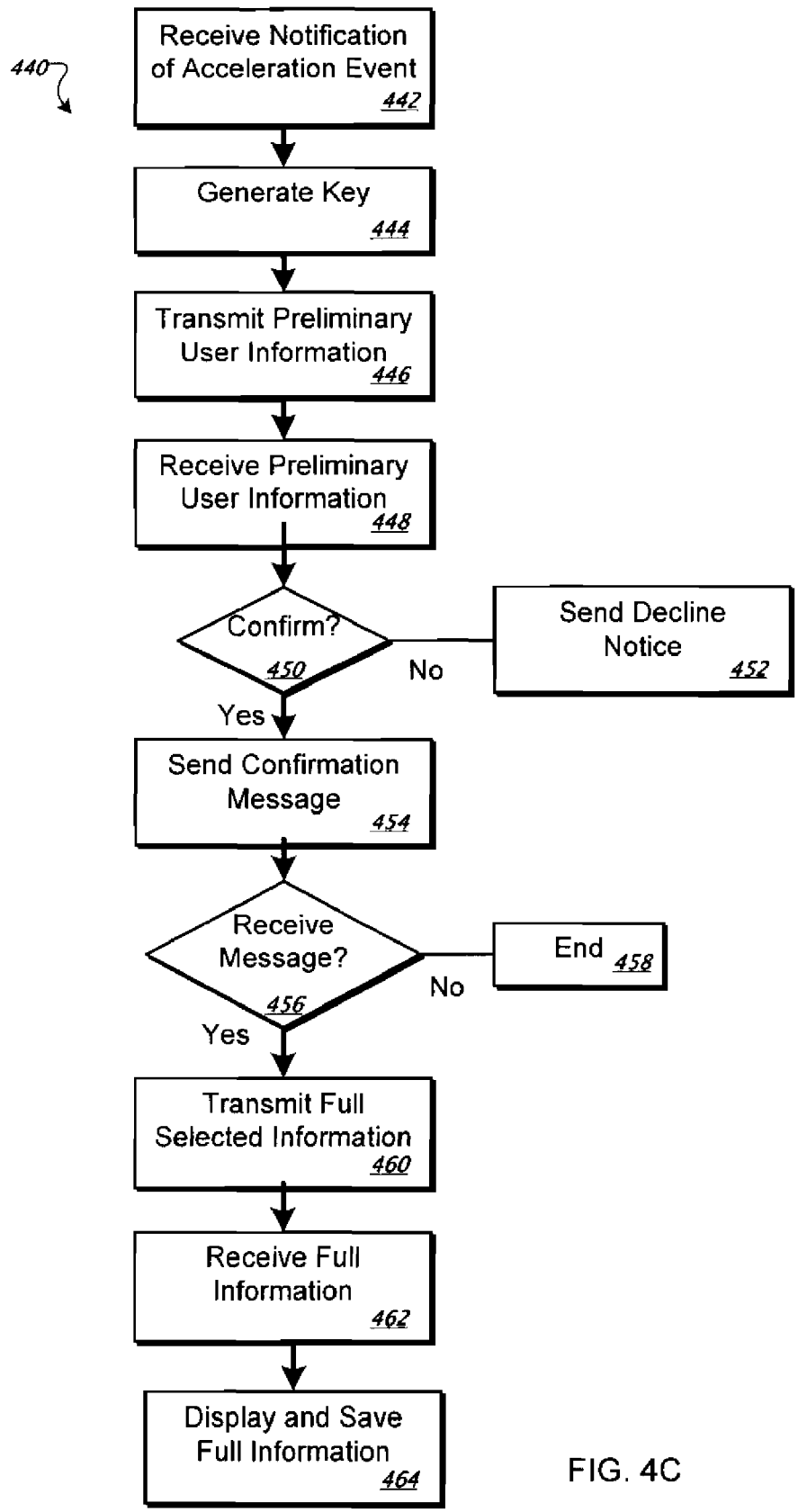
FIG. 4C is a flow chart of a process for establishing data transmission on a mobile device, with feedback from a user of the device.

FIG. 4C is a flow chart of a process 440 for establishing data transmission on a mobile device, with feedback from a user of the device. This process is similar to other processes discussed above, but includes additional detail concerning user feedback mechanisms such as those shown in FIGS. 2A to 2E. at box 442, a notification of an acceleration event is received. A key is generated at the box 444. The key may be generated, for example, using data about the acceleration event, as described above. Preliminary user information is transmitted at box 446. For example, such information may include public or semi-public information about the user of a device. Such information may be encrypted using the key or not be encrypted. At block 448, similar preliminary user information is received from another device, and may be encrypted or not encrypted.

The received preliminary user information may be displayed to the user of the first device (after it is decoded, of necessary), and the user may be prompted whether to confirm that they would like to share more detailed personal information with the other user. Box 450 shows a decision by the user for such confirmation. If the user chooses not to confirm further sharing, a notice declining to send additional information may be sent to the other device, as shown at block 452. If the user does confirm the sharing of additional information, the confirmation message may be sent to the other device 454.

Nearly simultaneously, a notice to decline or a confirmation message may be sent by the other device to the first device. If a message confirming an intent to share is received, as indicated by box 456, then selected information may be transmitted to the other device, as shown at block 460. If no message is received, then the process ends at box 458.

Full information may also be received from the other device, such as after that other device has received an indication of an intent to share from its user and has also received a confirmation message sent at box 454. When the full information is received from the other device, it may be displayed, and stored on the first device, as shown at block 464.

In this manner, limited information may be sent initially between two devices. Only after the users of both of the devices have elected to receive and transmit full information, is such full information transmitted from each device to the other.

Figure 4D:
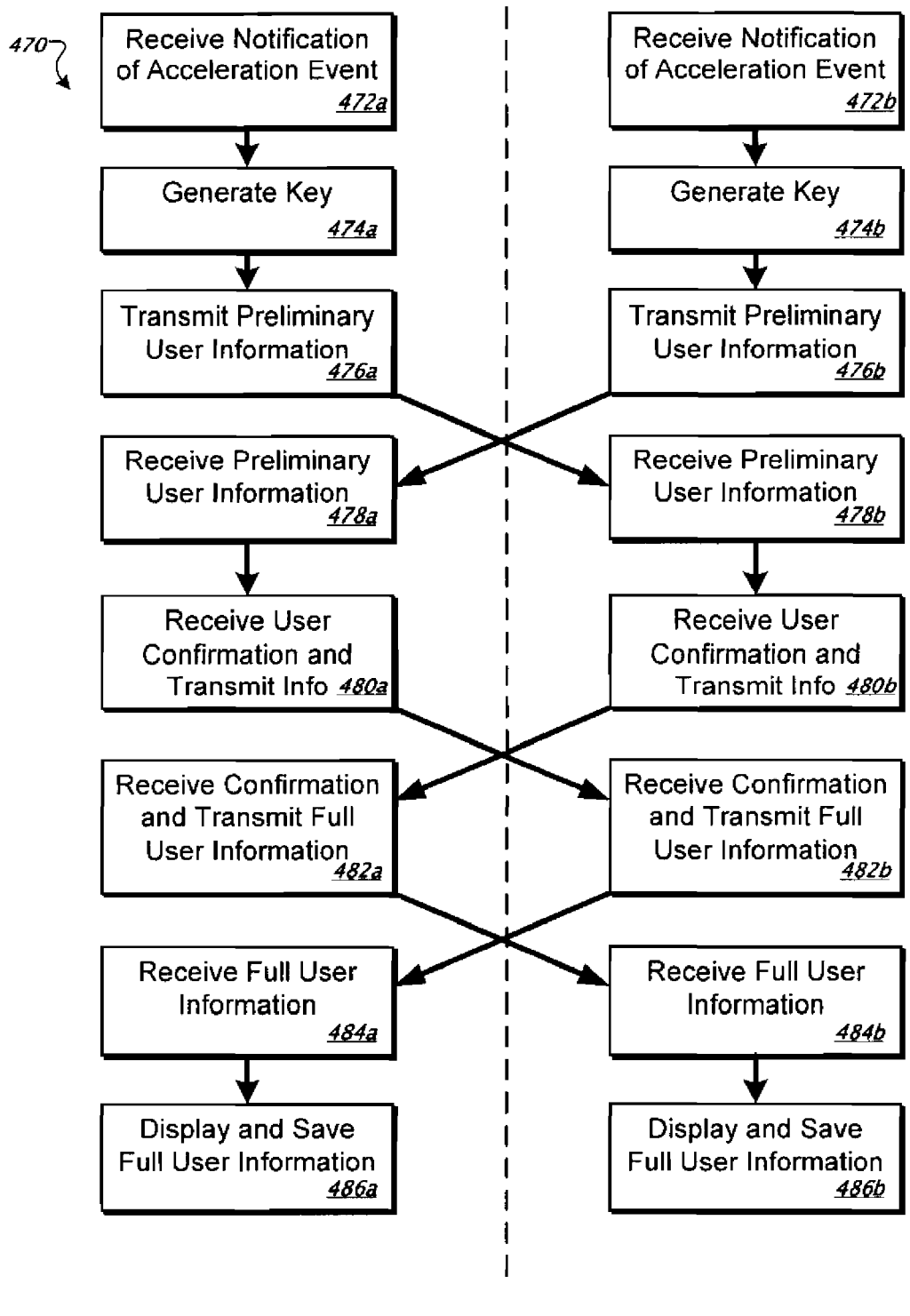
FIG. 4D is a swim lane diagram showing reciprocal actions by mobile devices negotiating a communication session.

FIG. 4D is a swim lane diagram showing reciprocal actions 470 by mobile devices negotiating a communication session. As an initial step, notifications of acceleration event are received at boxes 472a, b. Each mobile device may then generate a key using the received information or in another appropriate manner, as shown at boxes 474a, b. The devices may then, at boxes 476a, b, transmit preliminary user information reciprocally, in a manner like that shown for FIG. 4C. Upon each device's reception of the preliminary user information at boxes 478a, b, the devices may receive a confirmation from their respective users that they would like to receive and transmit more detailed information, at box 480a, b. Each device may then reciprocally transmit a confirmation regarding the intent of its associated user to share additional information, at boxes 482a, b, and may also transmit the full information from its particular device. The full information may be held, however, and not transmitted, until the device has received a confirmation from the corresponding other device.

At boxes 484a, b, full user information is received by each corresponding device from the other device, and at box 486, the devices each display and save the full user interface regarding the user of the other device in the process. In this manner, users of mobile devices may again share information in a convenient and efficient, yet secure manner in certain implementations.

Figure 5:
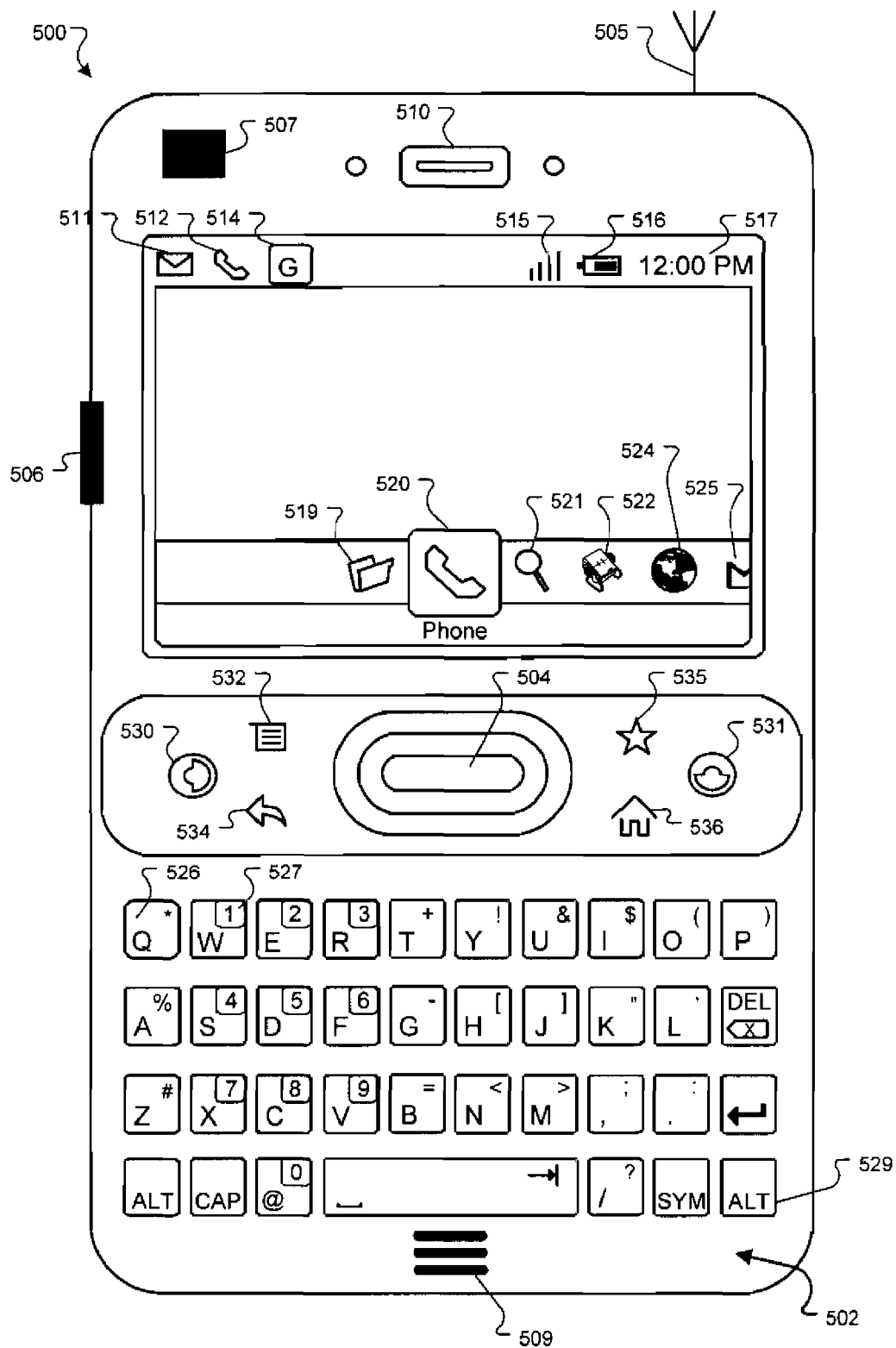
FIG. 5 is a schematic representation of an exemplary mobile device that implements embodiments of the notification techniques described herein.

Referring now to FIG. 5, the exterior appearance of an exemplary device 500 that implements the user interface features described here is illustrated. Briefly, and among other things, the device 500 includes a processor configured to exchange information in a secure manner according to coordinated movement that has occurred between the device 500 and another device.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WIDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540power management circuit.

The wireless or wired computer network connection 506 may be a modem connection, a local-area network (LAN) connection including the Ethernet, or a broadband wide-area network (WAN) connection such as a digital subscriber line (DSL), cable high-speed Internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
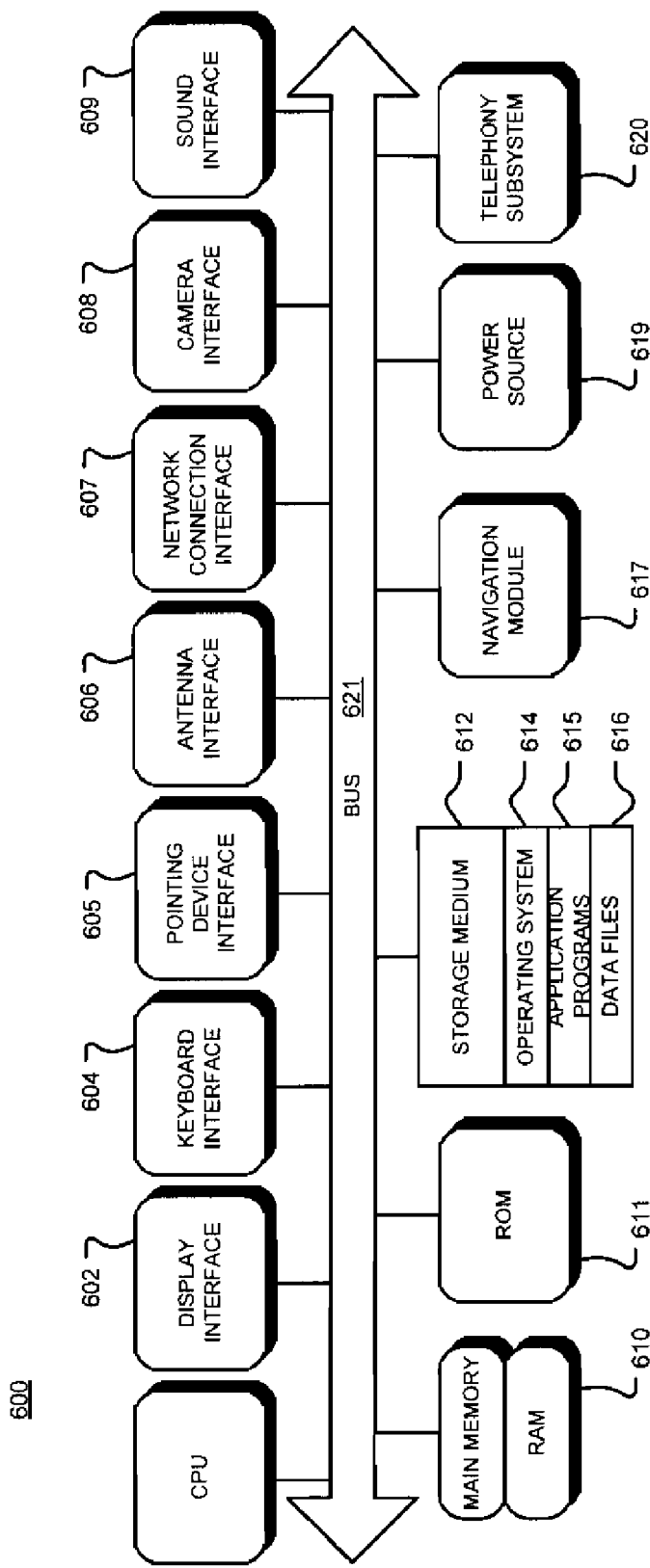
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access email applications, instant messaging applications, a video service application, a mapping application, or an imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for secure nearby communication using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
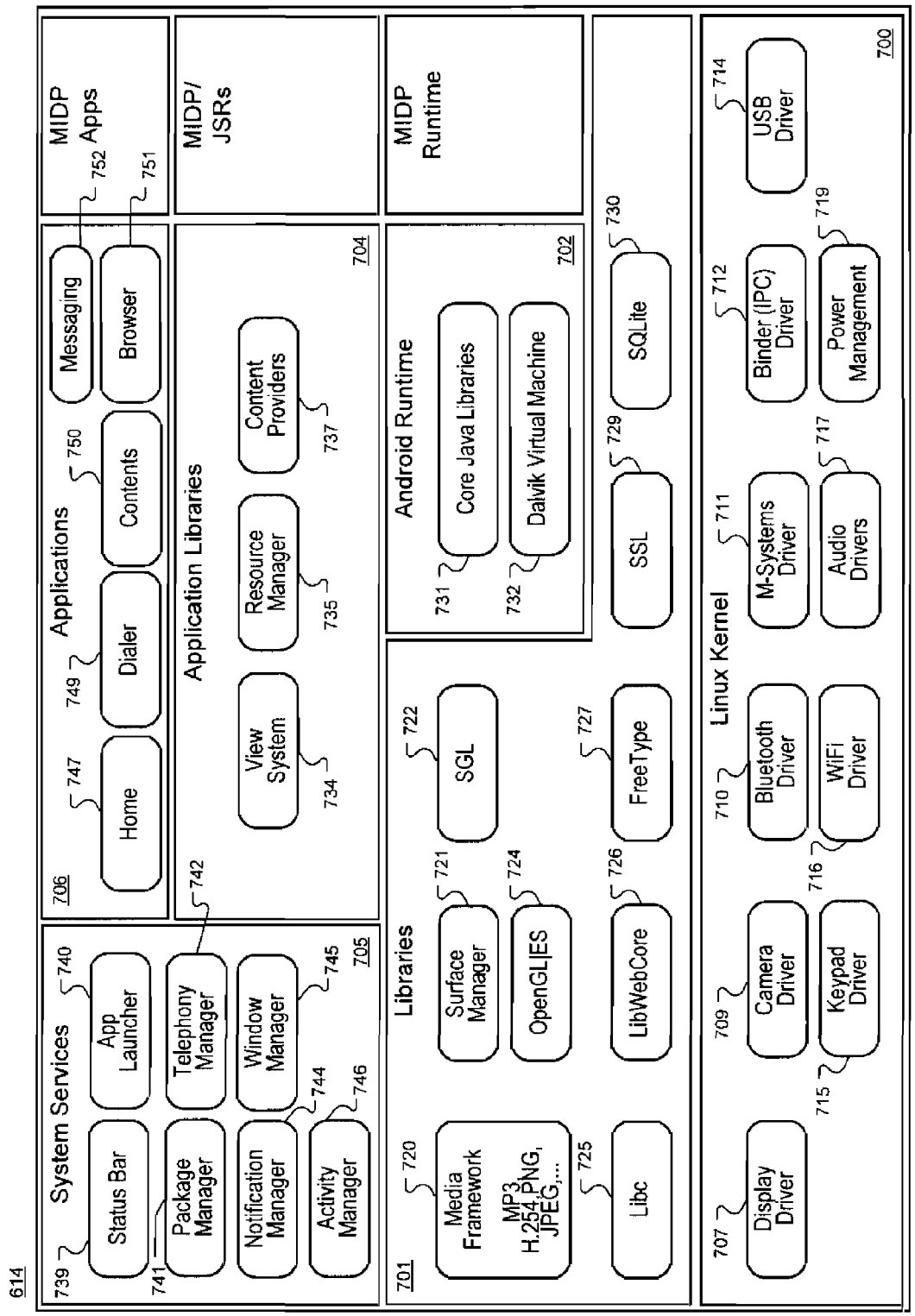
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the ANDROID mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751. Each of the applications may generate graphical elements that either do or do not have long press interactions. As described above, those that do not have long press interactions may provide no immediate visual feedback when they are first pressed, while those that do have such interactions may be highlighted between the time they are first pressed and the expiration of the long press period. Also, the highlighting may not occur exactly upon a press, so that mere tapping of an item does not cause it to be highlighted; instead, the highlighting may occur upon the expiration of a short press period that is slightly more than the time period for a tap, but appreciably shorter than a long press period.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
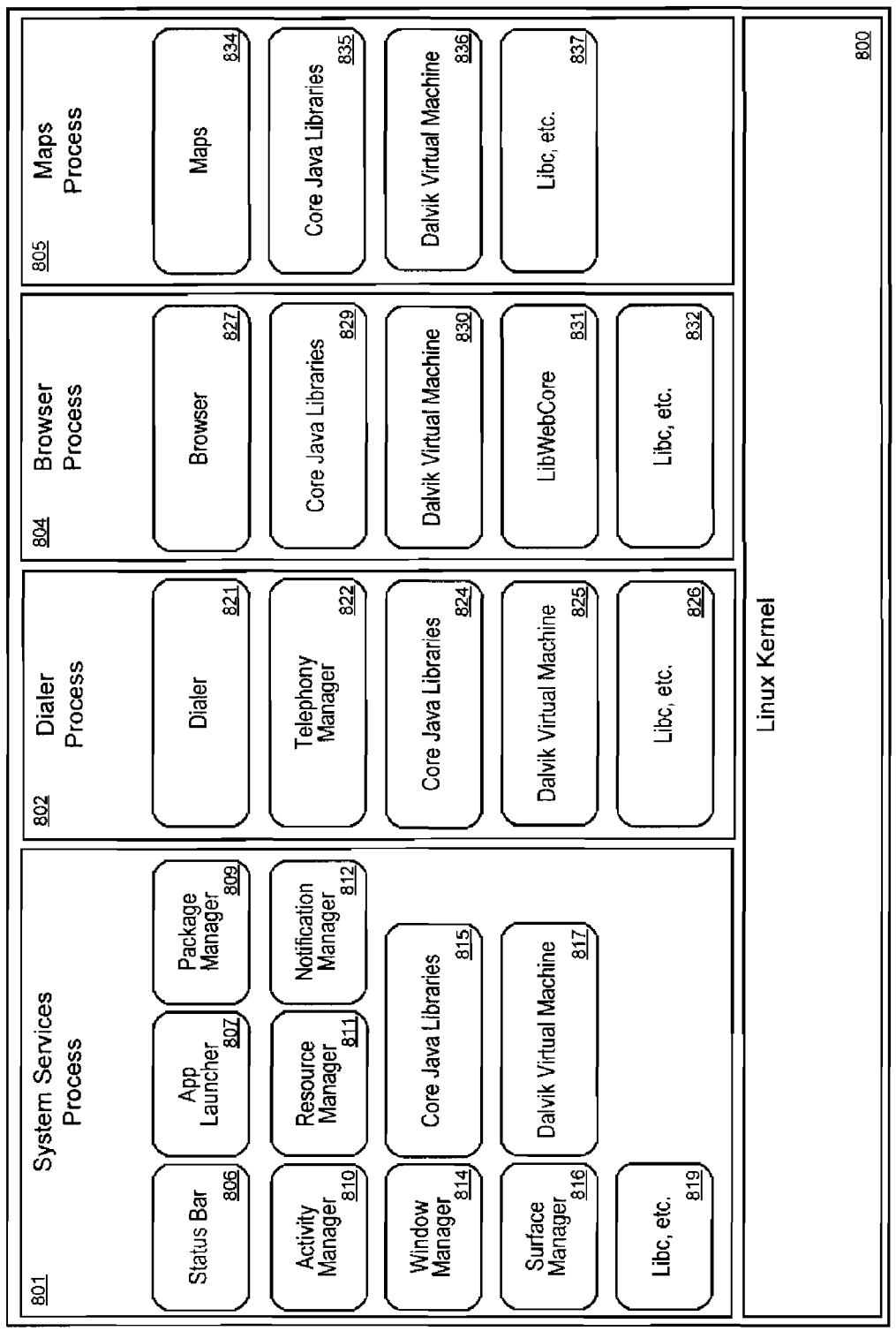
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
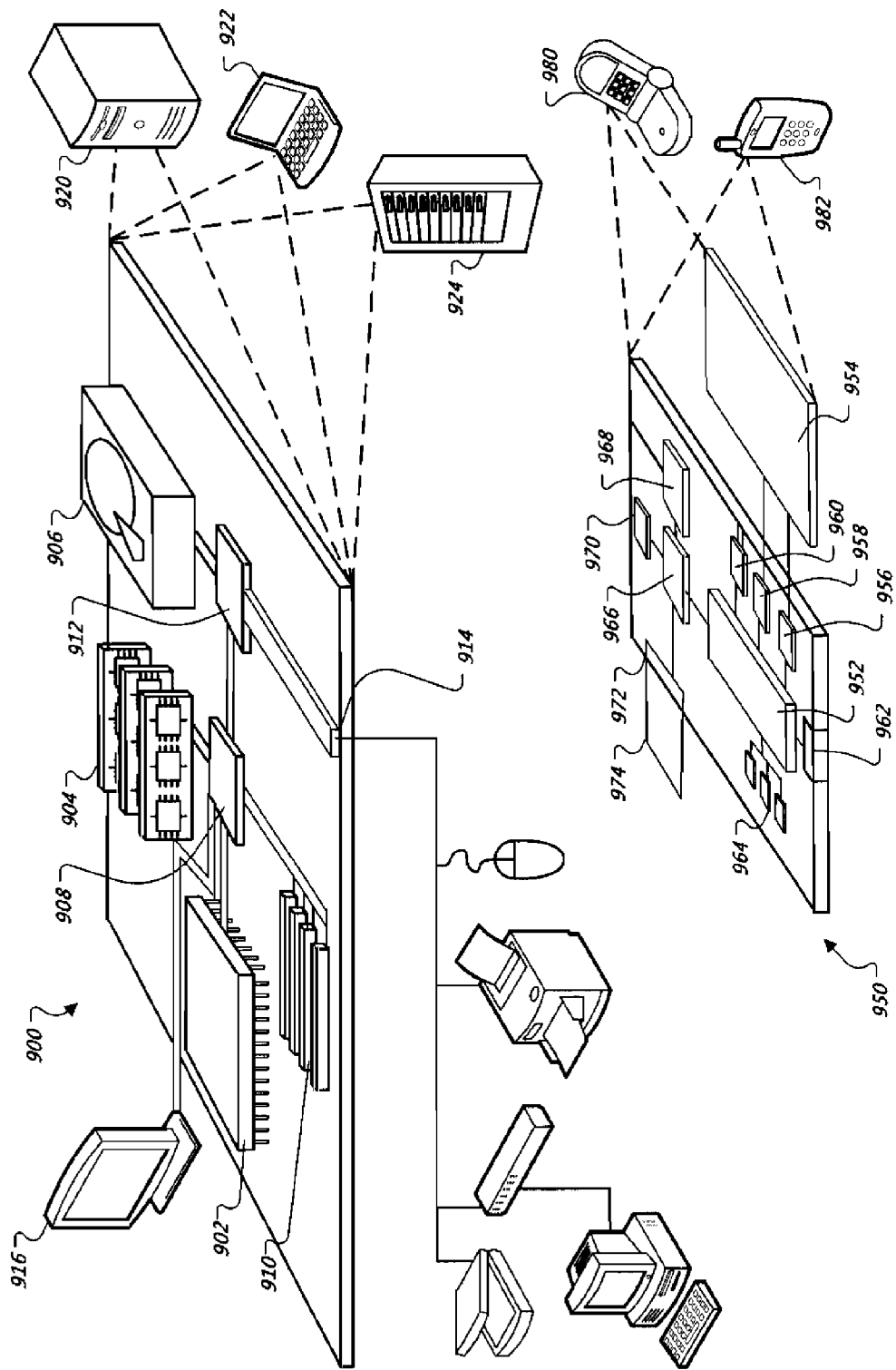
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular types of coordinated motion, but other forms of motion may also be addressed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
a first mobile device configured to provide a notification of a motion of the first mobile device in response to the motion and send selected data to a second mobile device, wherein the notification indicates an intent to transfer data of the first mobile device to the second mobile device; and the second mobile device in close physical proximity to the first mobile device, the second mobile device configured to receive the notification indicating an intent by the first mobile device to transfer data to the second mobile device, receive data specifying a first predefined level of access to data of the first mobile device, determine a second predefined level of access to data of the second mobile device, and receive the selected data from the first mobile device, wherein the selected data received from the first mobile device is selected from the first mobile device based on a determination of a lower of the first predefined level of access of the first mobile device and the second predefined level of access to data of the second mobile device.

2. The system of claim 1, wherein the first predefined level of access to data of the first mobile device and the second predefined level of access to data of the second mobile device are user-selectable.

3. The system of claim 1, the first mobile device comprises an accelerometer configured to detect motion of the first mobile device.

4. The system of claim 1, wherein the second mobile device is further configured to send data from the second mobile device to the first mobile device, wherein the data sent from the second mobile device is selected from the second mobile device based on a determination of the lower of the first predefined level of access of the first mobile device and the second predefined level of access to data of the second mobile device.

5. A method for sharing information between a first mobile device and a second mobile device, the method comprising:
receiving, by a second mobile device, a notification of a motion of a first mobile device, wherein:
the first mobile device is in close proximity to the second mobile device at the time of the motion of the first mobile device, and
the notification indicates an intent to transfer data of the first mobile device to the second mobile device;
receiving data specifying a first predefined level access to data of the first mobile device;
determining a second predefined level of access to data of the second mobile device;
determining a lower of the first predefined level of access to data of the first mobile device and the second predefined level of access to data of the second mobile device, wherein the determined lower of the first and second predefined levels of access is usable to select data of the first mobile device to be transferred to the second mobile device;
based on the determined lower of the first and second predefined levels of access, selecting data of the first mobile device to be transferred to the second mobile device; and
receiving, by the second mobile device, the selected data of the first mobile device.

6. The method of claim 5, wherein detecting a motion from the first mobile device comprises obtaining acceleration data from an accelerometer in the first mobile device.

7. The method of claim 5, wherein the motion comprises momentary contact between the first mobile device and the second mobile device.

8. The method of claim 5, further comprising detecting a motion from the second mobile device wherein the motions of the first and second mobile devices comprise coordinated hand-held motions of the first mobile device and the second mobile device at a distance by which the first and second mobile devices are not in contact with each other.

9. The method of claim 5, further comprising receiving, from the first mobile device, key derived from an acceleration measurement of the first mobile device, and further comprising using the key to decode encoded information from the first mobile device.

10. The method of claim 5, further comprising, detecting a motion from the second mobile device; and determining that the motion from the first mobile device matches the motion from the second mobile device; and upon a determination that the motions match each other, prompting a user of the first device to confirm an intent to transmit data to the second mobile device.

11. The method of claim 5, further comprising receiving, from a user of the first mobile device, confirmation to share private information with the second mobile device, and receiving the private data with the second mobile device only if the confirmation is received.

12. The method of claim 5, wherein the users of the first and second mobile devices are permitted by their respective devices to select the level access.

13. The method of claim 5, wherein second mobile device tags the data received by the second mobile device as being received as shared data.

14. The method of claim 5, further comprising detecting a motion from the second mobile device; and determining that the motion from the first mobile device matches the motion from the second mobile device, where the determination that the motions match each other comprises comparing patterns of the motions and times at which the motions occurred.

15. The method of claim 14, wherein the motions are determined to match if the pattern and time of the motion for the first mobile device are separated from the pattern and time of the second mobile device by less than a predetermined separation distance.

16. The method of claim 5, further comprising automatically sending, with the second mobile device, data of a type that matches the data received from the first mobile device.

17. The method of claim 16, wherein the received and transmitted data corresponds to contact information for users of the second mobile device and the first mobile device, respectively.

18. The method of claim 5, wherein the shared data comprises contact information, and the sharing is dynamic such that when the contact information on the first mobile device is updated, the contact information on the second mobile device is also updated automatically.

19. The method of claim 18, further comprising generating an event notification on the second mobile device when the contact information on the first mobile device is updated.

* * * * *

UNITED STATES PATENT AND TRADEMARK OFFICE
CERTIFICATE OF CORRECTION

| | | |
|---|---|---|
| PATENT NO. | : 8,219,028 B1 | Page 1 of 1 |
| APPLICATION NO. | : 12/415425 | |
| DATED | : July 10, 2012 | |
| INVENTOR(S) | : Flamholz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 291 days.

Signed and Sealed this
Thirteenth Day of November, 2012

David J. Kappos
*Director of the United States Patent and Trademark Office*

UNITED STATES PATENT AND TRADEMARK OFFICE
CERTIFICATE OF CORRECTION

PATENT NO. : 8,219,028 B1
APPLICATION NO. : 12/415425
DATED : July 10, 2012
INVENTOR(S) : Abraham I. Flamholz Page 1 of 1

It is certified that error appears in the above-identified patent and that said Letters Patent is hereby corrected as shown below:

Title Page, in Other Publications:

Column 2, line 3, delete "Blunt" and insert -- Bernt --, therefor.

Signed and Sealed this
Fourth Day of June, 2013

Teresa Stanek Rea
*Acting Director of the United States Patent and Trademark Office*